2,901,507
Patented Aug. 25, 1959

2,901,507

ALKYLAMINOALKYL 2,4,6-TRIMETHYL-BENZAMIDE

Merrill E. Speeter and Robert D. Birkenmeyer, Kalamazoo Township, Kalamazoo County, Mich., assignors to The Upjohn Company, Kalamazoo, Mich., a corporation of Michigan No Drawing. Application April 18, 1955
Serial No. 502,206

2 Claims. (Cl. 260—558)

This invention relates to a process for preparing benzoic acid compounds and to novel products obtained thereby. More particularly, the invention relates to a process for preparing 2,4,6-trimethylbenzoic acid compounds and to the novel compounds thus produced.

It is an object of the invention to provide a process for the preparation of 2,4,6-trimethylbenzoic acid compounds. Another object of the invention is to provide new and novel 2,4,6-trimethylbenzoic compounds and acid addition and quaternary ammonium salts thereof. Other objects and features of the invention will be apparent to those skilled in the art to which this invention pertains.

The novel 2,4,6-trimethylbenzoic acid compounds of the invention represented by the formula

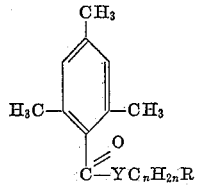

wherein Y is a member selected from the group consisting of oxygen, sulfur, and imino; R is a secondary-amino radical containing not more than eight carbon atoms and $n$ is an integer from one to six inclusive, and acid addition and quaternary ammonium salts thereof, are chracterized by pharmacological activity, and more specifically, local anesthetic activity. N-β-diethylaminoethyl-2,4,6-trimethylbenzamide, is especially characterized by high surface anesthetic activity.

The compounds of the invention are suitable for parenteral administration whereas 2,4,6-trimethylbenzoic acid compounds of high carbon content, because of their relative water-insolubility, are unsuitable for parenteral administration.

The process of the invention comprises reacting a 2,4,6-trimethylbenzoyl halide with a compound of the formula:

$$HYC_nH_{2n}R$$

wherein Y is a member selected from the group consisting of oxygen, sulfur and imino; R is a secondary-amino radical containing not more than eight carbon atoms and $n$ is an integer from one to six inclusive, to obtain a 2,4,6-trimethylbenzoic acid compound.

"Secondary-amino radical" as used in the specification and claims contains not more than eight carbon atoms and refers to di-alkyl-amino and cyclic-amino radicals comprising unsubstituted and alkyl-substituted morpholino, piperidino and pyrrolidino radicals.

In a more specific embodiment of this invention, a 2,4,6-trimethylbenzoyl halide is reacted with a compound of the formula:

$$HYC_nH_{2n}R$$

wherein Y, R and $n$ are as defined above, preferably in an inert solvent medium, and the resulting 2,4,6-trimethylbenzoic acid compound is isolated by removal of the solvent and further purified by conventional means, e.g., vacuum distillation, conversion to a salt, and the like. The reaction is conducted at a temperature between about zero and about 150 degrees centigrade, and preferably between about fifty and about 100 degrees centigrade, in the presence of an inert solvent such as methyl ethyl ketone, benzene, toluene, xylene, diethyl ether, diisopropyl ether, dioxan, acetone, diethyl ketone, and the like. To absorb the hydrogen halide produced in the reaction, an acid acceptor is preferably added to the reaction mixture. Suitable acid acceptors include alkali-metal carbonates and bicarbonates such as sodium carbonate, potassium carbonate, sodium bicarbonate, and the like; tertiary amines such as trimethylamine, triethylamine, pyridine, quinoline, and the like. Ordinarily, equimolar amounts of the 2,4,6-trimethylbenzoyl halide and the HYC$n$H$_{2n}$R compound are reacted in the presence of an acid acceptor of the kind noted above. Alternatively, the acid acceptor can be an additional amount of HYC$n$H$_{2n}$R.

Suitable secondary-amino alkylamines include β-diethylaminoethylamine, diethylaminomethylamine, γ-diethylaminopropylamine, δ-diethylaminobutylamine, zeta-diethylaminohexylamine, β-dibutylaminoethylamine, β-(1-pyrrolidyl)-ethylamine, β-(2,2-dimethyl-1-pyrrolidyl)-ethylamine, β - (1 - piperidyl) - ethylamine, β - (2 - methyl-1-piperidyl)-ethylamine, β-(4-morpholinyl)-ethylamine, B-(2-methyl-4-morpholinyl)-ethylamine, β-methylethylaminoethylamine, β-diisopropylaminopropylamine, and the like.

Suitable secondary-aminoalkanols include dialkylaminoalkanols such as β-diethylaminoethanol, β-dimethylaminoethanol, diethylaminomethanol, β-diethylaminopropanol, γ-diethylaminopropanol, δ-diethylaminobutanol, ε-diethylaminopentanol, β-dibutylaminopropanol, β-methylethylaminoethanol, β-methylpropylaminoethanol, β-methylhexylaminoethanol, and the like; heterocyclic aminoalkanols such as 1-pyrrolidylmethanol, β-1-pyrrolidylethanol, and the like; carbon-substituted pyrrolidylalkanols, piperidylalkanols, morpholinylalkanols such as β-(2-methyl-1-pyrrolidyl)ethanol, β-(2,2-dimethyl-1-pyrrolidyl)ethanol, B - (2 - ethyl - 1 - pyrrolidyl)ethanol, β - (2 -, 3-, and 4 - methyl - 1 - piperidyl)ethanols, β - (2-, 3-, and 4-ethyl-1-piperidyl)ethanols, β-(2-, and 3-methyl-4-morpholinyl)ethanols, β-(2-, and 3-ethyl-4-morpholinyl)ethanols, and the like.

Suitable secondary-aminoalkyl mercaptans include, for example, secondary-amino lower-alkyl mercaptans such as for example β-dimethylaminoethyl mercaptan, β-diethylaminoethyl mercaptan, β-diethylaminopropyl mercaptan, γ-diethylaminopropyl mercaptan, zeta-diethylaminohexyl mercaptan, β-dipropylaminoethyl mercaptan, β-methylethylaminoethyl mercaptan, β-methylpropylaminoethyl mercaptan, β-dibutylaminoethyl mercaptan, and the like; heterocyclic aminoalkyl mercaptans such as 1-pyrrolidylmethyl mercaptan, β-1-pyrrolidylethyl mercaptan, δ-1-pyrrolidylbutyl mercaptan, β-1-piperidylethyl mercaptan, β-4-morpholinylethyl mercaptan, and the like; carbon-substituted pyrrolidylalkyl-, piperidylalkyl-, and morpholinylalkyl mercaptans such as β-(2-methyl-1-pyrrolidyl)ethyl mercaptan, β-(2,2-dimethyl-1-pyrrolidyl) ethyl mercaptan, β-(2-ethyl-1-pyrrolidyl)ethyl mercaptan, β-(2-, 3-, and 4-methyl-1-piperidyl)ethyl mercaptans, β-(2-, 3-, and 4-ethyl-1-piperidyl)ethyl mercaptans, β-(2- and 3-methyl-4-morpholinyl)ethyl mercaptans, β-(2- and 3-ethyl-4-morpholinyl)ethyl mercaptans, and the like.

Due to the presence of basic nitrogen in the molecule, the 2,4,6-trimethylbenzoic acid compounds of the invention react with suitable acids to form acid addition salts.

Representative acids which may be used include the mineral acids such as hydrogen chloride, hydrogen bromide, sulfuric acid, or the like; aliphatic carboxylic acids such as acetic acid, lactic acid, tartaric acid, succinic acid, or the like; aromatic acids such as benzoic acid, salicylic acid, or the like.

Various procedures can be used to prepare the acid addition salts of the 2,4,6-trimethylbenzoic acid compounds of the invention. A convenient or preferred method involves reacting the 2,4,6-trimethylbenzoic acid compound with a selected acid in a solvent such as ether, ethanol, a mixture of ethanol and ethyl acetate, or the like. Upon distillation of the solvent, the acid salt remains as a residue which can be then be purified by recrystallization from solvents such as ethanol, methyl ethyl ketone, ethyl acetate, and the like. Other methods for preparing the acid addition salts of the 2,4,6-trimethylbenzoic acid compounds of the invention may also be used.

Quaternary ammonium salts of the 2,4,6-trimethylbenzoic acid compounds of the invention are prepared by mixing the 2,4,6-trimethylbenzoic acid compound with a selected ester, in stoichiometric proportions, in the presence of an organic solvent in which the resulting quaternary ammonium salt is insoluble. Representative esters which are used to form quaternary ammonium salts of the 2,4,6-trimethylbenzoic acid compounds of the invention include alkyl halides, aralkyl halides, and alkyl esters of arylsulfonic acids such as methyl bromide, methyl iodide, cetyl bromide, myristyl iodide, lauryl bromide, benzyl chloride, allyl bromide, ethyl p-toluenesulfonate, or the like, in which cases the 2,4,6-trimethylbenzoic acid compound and selected salt forming agent are mixed together, the mixture is heated and the resulting ammonium salt of the 2,4,6-trimethylbenzoic acid compound is thereafter isolated.

The following examples illustrate the process and products of the present invention but are not to be construed as limiting.

*Example 1.—β-Diethylaminoethyl 2,4,6-trimethylthiolobenzoate*

In a 500-milliliter, three-neck flask fitted with a stirrer, dropping funnel and reflux condenser are placed 11.7 grams (0.088 mole) of β-diethylaminoethyl mercaptan, 12.2 grams of anhydrous potassium carbonate and 200 milliliters of methyl ethyl ketone. The mixture is stirred and heated at reflux while adding sixteen grams (0.088 mole) of 2,4,6-trimethylbenzoyl chloride (Organic Syntheses 21, 77–79, 1941) dissolved in 100 milliliters of methyl ethyl ketone. After stirring at reflux for twenty hours, the reaction mixture is cooled, filtered and the solvent distilled on a steam bath. The crude, oily residue thus obtained is cooled, made basic with dilute sodium hydroxide solution and extracted with ether. The extracts are dried over anhydrous magnesium sulfate, filtered and then distilled. There is obtained fourteen grams of β-diethylaminoethyl 2,4,6-trimethylthiolobenzoate (57 percent yield), boiling at 120 degrees centigrade/0.05 millimeter.

*Analysis.*—Calc. for $C_{16}H_{25}NOS$: C, 68.77; H, 9.02; N, 5.01; S, 11.47. Found: C, 69.07; H, 8.76; N, 5.40; S, 11.87.

While the above and succeeding examples illustrate the use of 2,4,6-trimethylbenzoyl chloride, the process is not to be limited to this halide as other 2,4,6-trimethylbenzoyl halides and illustratively, 2,4,6-trimethylbenzoyl bromide (obtained by reacting mesitoic acid with thionyl bromide by the process set forth in Organic Syntheses 21, 77–79, 1941), can be used.

On reacting the compound thus obtained with hydrogen chloride in a dry ether medium followed by recrystallizing the resulting product from an isopropanol-methylcyclohexane mixture, there is obtained β-diethylaminoethyl 2,4,6-trimethylthiolobenzoate hydrochloride melting between 148 and 149 degrees centigrade (tube).

*Analysis.*—Calc. for $C_{16}H_{26}ClNOS$: C, 60.83; H, 8.31; Cl, 11.22; N, 4.43; S, 10.15. Found: C, 60.46; H, 8.29; Cl, 11.35; N, 4.81; S, 10.14.

On reacting β-diethylaminoethyl 2,4,6-trimethylthiolobenzoate with an acid such as sulfuric acid, acetic acid, benzoic acid, or the like, in an ethanol medium, the corresponding acid addition salt of β-diethylaminoethyl 2,4,6-trimethylthiolobenzoate is obtained such as β-diethylaminoethyl 2,4,6 - trimethylthiolobenzoate sulfate, β-diethylaminoethyl 2,4,6-trimethylthiolobenzoate acetate, β-diethylaminoethyl 2,4,6-trimethylthiolobenzoate, and the like.

On heating a benzene solution of β-diethylaminoethyl 2,4,6-trimethylthiolobenzoate and methyl bromide and cooling and concentrating the resulting solution, β-diethylaminoethyl 2,4,6 - trimethylthiolobenzoate methobromide is obtained.

Similarly, by reacting β-diethylaminoethyl 2,4,6-trimethylthiolobenzoate with other esters such as ethyl chloride, benzyl chloride, and the like, the corresponding quaternary ammonium salts of β-diethylaminoethyl 2,4,6-trimethylthiolobenzoate are obtained such as, for example, β-diethylaminoethyl 2,4,6-trimethylthiolobenzoate ethochloride, β - diethylaminoethyl 2,4,6 - trimethylthiolobenzoate benzyl chloride, and the like.

Following the above-described procedure except for the replacement of β-diethylaminoethyl mercaptan by other secondary-aminoalkyl mercaptans, the corresponding secondary-amino 2,4,6-trimethylthiolobenzoates are obtained such as zeta - diethylaminohexyl 2,4,6 - trimethylthiolobenzoate, β-dibutylaminoethyl 2,4,6-trimethylthiolobenzoate, β - methylethylaminoethyl 2,4,6 - trimethylthiolobenzoate, β-1-pyrrolidylethyl 2,4,6-trimethylthiolobenzoate, β-1-piperidylethyl 2,4,6-trimethylthiolobenzoate, β-4-morpholinylethyl 2,4,6 - trimethylthiolobenzoate, β - (2-methyl-1-pyrrolidyl)ethyl 2,4,6-trimethylthiolobenzoate, β-(2-methyl-1-piperidyl)ethyl 2,4,6-trimethylthiolobenzoate, β-(2-methyl-4-morpholinyl)ethyl 2,4,6-trimethylthiolobenzoate, and the like, including acid addition and quaternary ammonium salts thereof.

*Example 2.—N-β-diethylaminoethyl-2,4,6-trimethylbenzamide*

Following the procedure described in Example 1 except for the use of 18.3 grams (0.1 mole) of 2,4,6-trimethylbenzoyl chloride in 200 milliliters of methyl ethyl ketone, 11.6 grams (0.1 mole) of β-diethylaminoethylamine in 300 milliliters of methyl ethyl ketone and 13.8 grams of potassium carbonate, there is obtained twenty grams of N-β-diethylaminoethyl-2,4,6-trimethylbenzamide (76.5 percent yield) boiling at 140 degrees centigrade/0.06 millimeter. The product solidifies on cooling. On recrystallization from Skellysolve C, the substantially pure product is characterized by a melting point between 69 and 70 degrees centigrade (tube).

*Analysis.*—Calc. for $C_{16}H_{26}N_2O$: C, 73.23; H, 9.98; N, 10.68. Found: C, 73.17; H, 9.93; N, 10.50.

On reacting N-β-diethylaminoethyl-2,4,6-trimethylbenzamide with acids such as hydrochloric acid, sulfuric acid, benzoic acid, acetic acid, and the like, the corresponding acid addition salts are obtained such as N-β-diethylaminoethyl-2,4,6-triethylbenzamide hydrochloride, N-β-diethylaminoethyl-2,4,6-trimethylbenzamide sulfate, N-β-diethylaminoethyl - 2,4,6 - trimethylbenzamide benzoate, N-β-diethylaminoethyl-2,4,6-trimethylbenzamide acetate, and the like.

On reacting N - β - diethylaminoethyl - 2,4,6 - trimethylbenzamide with various esters such as methyl bromide, ethyl chloride, benzyl chloride, and the like, the corresponding quaternary ammonium salts of N - β - diethylaminoethyl-2,4,6-trimethylbenzamide are obtained such as N-β-diethylaminoethyl-2,4,6-trimethylbenzamide methobromide, N-β-diethylaminoethyl-2,4,6-trimethylbenzamide ethochloride, N-β-diethylaminoethyl-2,4,6-trimethylbenzamide benzyl chloride, and the like.

Similarly, on replacing β-diethylaminoethylamine by other secondary-aminoalkylamines, other 2,4,6-trimethylbenzamides are obtained such as N-diethylaminomethyl-2,4,6-trimethylbenzamide, N-zeta-diethylaminohexyl-2,4,6-trimethylbenzamide, N-methyl - N - β - diethylaminoethyl-2,4,6-trimethylbenzamide, N - β - dibutylaminoethyl-2,4,6-trimethylbenzamide, N - β - (1 - pyrrolidyl)ethyl-2,4,6-trimethylbenzamide, N-β-(2,2 - dimethyl-1-pyrrolidyl)ethyl-2,4,6-trimethylbenzamide, N - β - (1-piperidyl)ethyl-2,4,6-trimethylbenzamide, N-β-(2-methyl-1-piperidyl)ethyl-2,4,6-trimethylbenzamide, N-butyl-N-γ-(1-piperidyl)propyl-2,4,6-trimethylbenzamide, N-β-(4-morpholinyl)ethyl-2,4,6-trimethylbenzamide, N - β - (2-methyl-4-morpholinyl)-ethyl-2,4,6-trimethylbenzamide, N - β - methylethylamino-ethyl-2,4,6-trimethylbenzamide, N - β - diisopropylamino-propyl-2,4,6-trimethylbenzamide, and the like, including acid addition and quaternary ammonium salts thereof.

*Example 3.—β-Diethylaminoethyl 2,4,6-trimethylbenzoate*

Following the procedure set forth in Example 1 except for the use of 21 grams (0.115 mole) of 2,4,6-trimethylbenzoyl chloride in 200 milliliters of methyl ethyl ketone, 13.5 grams (0.115 mole) of β-diethylaminoethanol in 300 milliliters of methyl ethyl ketone and 15.9 grams of potassium carbonate, there is obtained nineteen grams (62.8 percent yield) of β-diethylaminoethyl 2,4,6-trimethylbenzoate boiling at 107 degrees centigrade/0.03 millimeter.

*Analysis.*—Calculated for $C_{16}H_{25}NO_2$: N, 5.33. Found: N, 5.32.

Following the procedure described in Example 1, β-diethylaminoethyl 2,4,6-trimethylbenzoate is reacted with hydrogen chloride in dry ether and recrystallized from absolute ethanol to form β-diethylaminoethyl 2,4,6-trimethylbenzoate hydrochloride melting between 178 and 179 degrees centigrade (tube).

*Analysis.*—Calculated for $C_{16}H_{26}ClNO_2$: C, 64.00; H, 8.40; Cl, 11.83; N, 4.77. Found: C, 63.84; H, 8.44; Cl, 11.88; N, 4.71.

Following the procedure described in Example 1, β-diethylaminoethyl 2,4,6-trimethylbenzoate is reacted with suitable acids such as sulfuric acid, benzoic acid, acetic acid, and the like, to form the corresponding acid addition salts of β-diethylaminoethyl 2,4,6-trimethylbenzoate such as β-diethylaminoethyl 2,4,6-trimethylbenzoate sulfate, β-diethylaminoethyl 2,4,6-trimethylbenzoate benzoate, β-diethylaminoethyl 2,4,6-trimethylbenzoate acetate, and the like.

Similarly, on reacting β-diethylaminoethyl 2,4,6-trimethylbenzoate with various esters such as methyl bromide, ethyl chloride, benzyl chloride, and the like, the corresponding quaternary ammonium salts of β-diethylaminoethyl 2,4,6-trimethylbenzoate are obtained such as β-diethylaminoethyl 2,4,6-trimethylbenzoate methobromide, β-diethylaminoethyl 2,4,6-trimethylbenzoate ethochloride, β-diethylaminoethyl 2,4,6-trimethylbenzoate benzyl chloride, and the like.

On replacing β-diethylaminoethanol by other secondary-amino-alkanols, the corresponding 2,4,6-trimethylbenzoic acid esters are obtained such as β-dimethylaminoethyl 2,4,6-trimethylbenzoate, dimethylaminomethyl 2,4,6-trimethylbenzoate, diethylaminomethyl 2,4,6-trimethylbenzoate, β-diethylaminopropyl 2,4,6-trimethylbenzoate, γ-diethylaminopropyl 2,4,6-trimethylbenzoate, β-diethylaminobutyl 2,4,6-trimethylbenzoate, δ-diethylaminobutyl 2,4,6-trimethylbenzoate, ε-diethylaminopentyl 2,4,6-trimethylbenzoate, zeta-diethylaminohexyl 2,4,6-trimethylbenzoate, β-dipropylaminoethyl 2,4,6-trimethylbenzoate, β - diisopropylaminoethyl 2,4,6 - trimethylbenzoate, γ - dipropylaminopropyl 2,4,6-trimethylbenzoate, β-dibutylaminoethyl 2,4,6-trimethylbenzoate, β-dibutylaminopropyl 2,4,6-trimethylbenzoate, β-methylethylaminoethyl 2,4,6-trimethylbenzoate, β-methylhexylaminoethyl 2,4,6-trimethylbenzoate, 1-pyrrolidylmethyl 2,4,6-trimethylbenzoate, β-1-pyrrolidylethyl 2,4,6-trimethylbenzoate, δ-1-pyrrolidylbutyl 2,4,6-trimethylbenzoate, β-(2-methyl-1-pyrrolidyl)ethyl 2,4,6-trimethylbenzoate, β-(2,2-dimethyl-1-pyrrolidyl)ethyl 2,4,6-trimethylbenzoate, β-(2-ethyl-1-pyrrolidyl)ethyl 2,4,6-trimethylbenzoate, β-(2-, 3-, and 4-methyl-1-piperidyl)ethyl 2,4,6-trimethylbenzoates, β-(2-, 3-, and 4-ethyl-1-piperidyl)ethyl 2,4,6-trimethylbenzoates, β-(2- and 3-methyl-4-morpholinyl)ethyl 2,4,6-trimethylbenzoates, and the like, including acid addition and quaternary ammonium salts thereof.

It is to be understood that the invention is not to be limited to the exact details of operation or exact compounds shown and described herein, as obvious modifications and equivalents will be apparent to one skilled in the art. The invention is therefore to be limited only by the scope of the appended claims.

We claim:

1. A compound of the formula

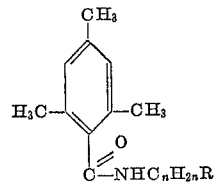

wherein $n$ is an integer from one to six, inclusive, R is a saturated secondary amino radical containing not more than eight carbon atoms and is selected from the group consisting of a dialkylamino and a cyclicamino radical selected from the group consisting of a morpholino, piperidino, and pyrrolidino radical and nontoxic acid addition salts thereof.

2. N-β-diethylaminoethyl-2,4,6-trimethylbenzamide.

References Cited in the file of this patent

UNITED STATES PATENTS

| | | |
|---|---|---|
| 1,193,649 | Wildman et al. | Aug. 8, 1916 |
| 1,476,934 | Volwiler et al. | Dec. 11, 1923 |
| 2,748,134 | Stoll et al. | May 29, 1956 |
| 2,831,016 | Rabjohn | Apr. 15, 1958 |

FOREIGN PATENTS

| | | |
|---|---|---|
| 105,746 | Great Britain | Feb. 27, 1918 |
| 460,250 | Great Britain | Jan. 25, 1937 |

OTHER REFERENCES

Dvoretzky et al.: J. Org. Chem., 18, 615–619 (1953).
Rabjohn et al.: J. Organic Chem. 20, 271–273 (1955). (Article published in J. Organic Chem. February 1955, and was received for publication November 4, 1954.)